United States Patent
Klaer et al.

(10) Patent No.: US 12,491,693 B2
(45) Date of Patent: Dec. 9, 2025

(54) DEVICE AND METHOD FOR MONITORING A TABLET PRESS MACHINE, PREFERABLY DURING CONTINUOUS OPERATION, BY MEANS OF A MEASURING DEVICE ATTACHED TO A PRESS PUNCH

(71) Applicant: KORSCH AG, Berlin (DE)

(72) Inventors: Ingo Klaer, Berlin (DE); Mies Stephan, Berlin (DE)

(73) Assignee: Korsch AG, Berlin (DE)

( * ) Notice: Subject to any disclaimer, the term of this patent is extended or adjusted under 35 U.S.C. 154(b) by 415 days.

(21) Appl. No.: 17/763,766

(22) PCT Filed: Sep. 23, 2020

(86) PCT No.: PCT/EP2020/076488
§ 371 (c)(1),
(2) Date: Mar. 25, 2022

(87) PCT Pub. No.: WO2021/058516
PCT Pub. Date: Apr. 1, 2021

(65) Prior Publication Data
US 2022/0332077 A1    Oct. 20, 2022

(30) Foreign Application Priority Data

Sep. 27, 2019 (DE) .................... 10 2019 126 164.3

(51) Int. Cl.
*B30B 15/26* (2006.01)
*B30B 11/08* (2006.01)
*B30B 15/00* (2006.01)
*B30B 15/06* (2006.01)

(52) U.S. Cl.
CPC .............. *B30B 15/26* (2013.01); *B30B 11/08* (2013.01); *B30B 15/0094* (2013.01); *B30B 15/065* (2013.01)

(58) Field of Classification Search
None
See application file for complete search history.

(56) References Cited

FOREIGN PATENT DOCUMENTS

| | | |
|---|---|---|
| AT | 501762 B1 | 11/2006 |
| CN | 108705805 B | 4/2019 |
| DE | 202005017516 U1 | 1/2006 |
| DE | 102015202781 A1 | 8/2016 |
| DE | 102015224778 A1 | 6/2017 |
| JP | S6042492 U | 3/1985 |
| KR | 20080010536 A | 1/2008 |
| KR | 20090004219 A | 1/2009 |
| KR | 20120133196 A | 12/2012 |
| WO | 0164365 A1 | 9/2001 |
| WO | 2017002561 A1 | 1/2017 |
| WO | 2018109813 A1 | 6/2018 |

OTHER PUBLICATIONS

Watt & Armstrong, Tablet and Capsule Machine Instrumentation, Pharmaceutical Press, 2007, 258 pgs (Year: 2007).*

* cited by examiner

*Primary Examiner* — Yung-Sheng M Tsui
(74) *Attorney, Agent, or Firm* — Chambliss, Bahner & Stophel, P.C.; Stephen D. Adams

(57) ABSTRACT

The invention relates to a punch for a tableting machine. The punch preferably has a measuring device that can function in an energy self-sufficient manner independently of the power supply to the tableting machine. Furthermore, the invention relates to a tableting machine comprising the above-mentioned punch and a method for monitoring a tableting machine with the punch according to the invention during operation.

18 Claims, No Drawings

DEVICE AND METHOD FOR MONITORING A TABLET PRESS MACHINE, PREFERABLY DURING CONTINUOUS OPERATION, BY MEANS OF A MEASURING DEVICE ATTACHED TO A PRESS PUNCH

The invention preferably relates to a punch for a tableting machine. The punch preferably has a measuring device that can function independently of the power supply to the tableting machine.

Furthermore, the invention preferably relates to a tableting machine and a system which includes the above-mentioned punch.

Additionally, the invention relates to a method for monitoring a tableting machine with the punch according to the invention during operation. The measuring device of the punch preferably comprises a sensor, a computing unit and a communication unit as well as a memory unit. The sensor of the measuring device records physical or chemical measured values. Subsequently, the communication unit of the measuring device preferably sends the recorded measured values of the sensor to a programmable logic controller of the tableting machine and/or to a data processing unit and/or the recorded measured values of the sensor are preferably saved on the memory unit of the measuring device.

PRIOR ART

Tableting machines are primarily used for the production of tablets on an industrial scale. Tableting machines are based on the principle that in a first step a die is filled with a powder mixture to be tableted. The mixture is then compressed into a tablet by the interaction of an upper punch and a lower punch. Modern tableting machines can produce several million tablets per hour with multi-tip tooling.

The large number of compression procedures leads to wear on the tooling and can also generate wear on various components of the tableting machine. Furthermore, set machine parameters may prove to be no longer optimally suited for the compression procedure in the course of operation, for example due to temperature changes in the machine environment and/or vibrations. Both wear and unsuitable operating parameters can therefore lead to defective compression procedures and damage components of the tableting machine as a whole. Various types of measuring equipment are used in the prior art for monitoring such defects. An essential component of a measuring device is a sensor.

A sensor (also detector or transducer or probe) is a technical component and preferably the first element of a measuring chain in a measuring device. A sensor can determine physical (e.g. heat quantity, temperature, humidity, pressure, sound field parameters, brightness, acceleration) or chemical (e.g. pH value, ionic strength, electrochemical potential) properties and/or the material composition of its environment qualitatively or quantitatively as a measured variable. These variables are detected by means of physical or chemical effects and converted into an electrical signal that can be processed further. Sensors within machine tools, in particular forming machines such as presses or punches, are well known.

DE 10 2006 002 359 B4 discloses a tableting machine in the form of a rotary tableting machine that has a temperature sensor in the immediate vicinity of its die. The sensor is stationary, not rotating with the turret, e.g. attached to the machine frame. In particular, the sensor records temperature values of the tablets in production in order to monitor the production process.

A disadvantage of such a tableting machine is that only one physical property can be recorded, namely the temperature inside the compression area. Furthermore, the temperature can only be measured when stationary at one point in the compression area.

DE 10 2005 051 567 B4 discloses a tableting machine—a rotary tableting machine—as well as a method for displacement measurement of a punch. Here, the punches of the rotary tableting machine are equipped with markers. The rotational movement of the punches causes them to pass a stationary sensor (mounted outside the turret). This sensor records the changes in position of the markers, which are then evaluated.

The document DE 195 02 596 C2 describes sensors and measuring devices for monitoring the tableting process. Here, force sensors are attached to both an upper and a lower compression roller in order to determine compression force values of a pair of punches. In conjunction with the turret position, the measurements and previously determined machine parameters are used to measure and calculate displacement-compression force assignments.

The disadvantage of this arrangement is that the compression force is not measured directly at the punches. Between the sensor and the punch there are components (compression roller, compression roller bearing, compression stations) of different strength and rigidity. These components influence the quality of the force measurement. Another disadvantage is the fact that only one physical property can be recorded using this sensor arrangement, namely the force acting on the compression roller through the punch.

An essential element for the functionality of tableting machines is the punch, which is why it is particularly important to monitor it. In the prior art, some forming machines, in particular tableting machines, are known that comprise a sensor that is adapted to monitor compression forces on a punch. However, the known designs for monitoring compression forces on punches have significant disadvantages, as will become clear in the following.

The document DD 294 457 A5 describes a sensor for force measurement on tableting machines. Here, a force sensor is installed in a piston body. A punch is attached to this piston body, so that the force sensor is arranged above the punch (in the case of the upper punch) or below (in the case of the lower punch). The force sensor is wired to a power source via a corresponding hole in the piston body.

The disadvantage of force measurement with such an arrangement is that it cannot be implemented practically in tableting machines which are designed as rotary tableting machines. Punches in rotary tableting machines are directly guided by control cams. It is not feasible to mount each punch in a piston body and also to ensure the external power supply of the punches.

In addition, this arrangement of sensors in DD 294 457 A5 is provided exclusively for determining forces during a compression procedure. The detection of occurring forces, which can occur in a punch before or after a compression procedure, are not to be detected by means of the arrangement described in the document. Furthermore, the acceleration or temperature of the punch is also not possible solely because of the position of the sensor.

Such an arrangement also has disadvantages for eccentric tableting machines. For example, the punch must be mounted in a specifically designed piston body, whereby, among other things, no different loads partially occurring within the punch can be measured. These can be obtained, for example, disadvantageously, if the punch is not perpendicular to the powder material to be compressed.

The document DE 101 35 283 C2 discloses a method for compressing powder material. Deformations of the die table are measured or calculated for different compression forces. The sensors for force measurement are in direct connection with the punches and are mounted above (upper punch) and below (lower punch) the punches. The sensors are mounted on the contact surface of the punch heads of the punches.

Such a method is also not feasible from a practical point of view for tableting machines that are designed as rotary tableting machines, since in rotary tableting machines the punches are guided via control cams. The punches come into direct contact with the compression rollers of the rotary tableting machine with their punch head, so it is not practical to mount a sensor on the punch head.

Thus, there is a need for improvement to provide measurement techniques that can be easily and reliably integrated into a tableting machine or process, allowing continuous measurement and monitoring of process parameters.

OBJECTIVE OF THE INVENTION

The objective of the invention is to eliminate the disadvantages of the prior art and to provide an apparatus as well as a method for tableting machines to determine physical and/or chemical properties directly as well as continuously on and/or in a punch. In particular, it was an objective of the invention to provide means for the integration of measuring devices into a tableting machine, which are characterized by a high degree of flexibility and accuracy, in order to enable continuous measurements and/or monitoring of a variety of process parameters with respect to a punch in a tableting process.

SUMMARY OF THE INVENTION

The objective according to the invention is solved by the features of the independent claims. Advantageous embodiments of the invention are described in the dependent claims.

In a preferred embodiment, the invention relates to a punch for a tableting machine, characterized in that the punch has a measuring device which can function independently of a power supply to the tableting machine.

Since the punch of the tableting machine has a measuring device, measured variables that are directly related to this punch can be recorded without having to factor out the influences of other components. In addition, the mounting is possible in a simple manner without connection to the power supply of the tableting machine. Furthermore, due to the rotating punch in the case of a rotary tableting machine, the measuring device is advantageously not fixed in a stationary position at one location in the tableting machine. As a result, physical or chemical properties (e.g., measurement of temperature) can be recorded continuously throughout the rotation of the turret of a rotary tableting machine. Accordingly, the present invention advantageously enables the recording of measured values before, during and after a compression procedure, in contrast to known prior art devices.

In terms of the invention, the tableting machine is preferably a rotary tableting machine or an eccentric tableting machine.

According to the invention, the punch is preferably designed in such a way that it has a punch head, a punch barrel and a punch tip. The person skilled in the art is familiar with the terms punch head, punch barrel and punch tip. The measuring device is preferably comprised in the punch shaft or incorporated therein.

In a further preferred embodiment, the punch is characterized in that the measuring device has a sensor for recording physical and/or chemical properties of the punch and/or its environment. Physical properties are defined, for example, by heat quantity, temperature, humidity, pressure, sound field parameters, brightness, acceleration. Chemical properties are, for example, pH value, ionic strength, electrochemical potential. The properties can be recorded qualitatively or quantitatively as a measured variable.

Particularly preferably, the measuring device comprises several different sensors which record different physical or chemical properties (of the punch and/or its environment) in parallel at the same time. The combination of a plurality of different recorded measured values advantageously improves the accuracy of a statement about the condition of components of the tableting machine or the production process.

In a preferred embodiment of the invention, the punch is characterized in that the measuring device has a sensor, in particular for recording a force, a temperature or an acceleration of the punch and/or its environment. By recording these values, a statement can advantageously be made about the wear and functionality of the punch and/or the tableting machine in general.

In a further preferred embodiment of the invention, the punch is characterized in that the measuring device has a plurality of sensors which are adapted to measure the compression force, the temperatures of the punch and the punch tip, and to measure the linear and rotational accelerations of the punch. By measuring these values, statements can advantageously be made about the compression procedure, the functionality of the punch and the wear in general.

In a preferred embodiment, the measuring device comprises an active sensor. Active sensors generate a voltage due to their measuring principle and do not require any electrical auxiliary power. Active sensors can be, for example, thermocouples, light sensors or pressure sensors. The installation of active sensors advantageously entails lower energy consumption.

In a further embodiment, the sensor of the measuring device is designed as a passive sensor. Passive sensors contain passive components whose parameters are changed by the measured variable. These parameters are converted into electrical signals by primary electronics. This requires externally supplied auxiliary power. Passive sensors are, for example: strain gauge load cells, resistance thermometers, strain gauges, magnetic field sensors (Hall probe). Passive sensors have the advantage of providing particularly accurate measurement results.

In a preferred embodiment of the measuring device, the sensor is a temperature sensor. By detecting a temperature, conclusions can be drawn about the function of the punch guide and the lubrication, which can provide information about wear. By recording the temperature and the temperature curve of the punch tip, corresponding conclusions can be drawn about a compression procedure.

Furthermore, by monitoring the temperature of the punch and/or its environment, it is possible preferably to draw conclusions about temperature values of the pressing materials. This is highly relevant in a tableting process for temperature-sensitive pressing materials. The compression of temperature-sensitive pressing materials can only be accomplished in certain temperature ranges. The compression process can therefore be adjusted by the recorded values and/or also aborted if these values exceed or fall below a threshold value.

Furthermore, recorded temperature values of the punch can advantageously be used to monitor or check compression or expansion of the punch due to temperature fluctuations.

Preferably, the temperature can be recorded in many ways using different sensors and measuring devices. Preferred sensors for recording temperature are listed below. However, the invention is not limited to sensors in general, their method of operation, or their method of construction.

A preferred temperature sensor comprises an NTC thermistor, i.e. a hot conductor. This has a negative temperature coefficient, so that when the temperature increases, the resistance drops and a higher current flows. However, PTC thermistors, i.e., cold conductors, which have a positive temperature coefficient, can also preferably be used, so that when the temperature increases, the resistance increases and a lower current flows.

In another preferred embodiment, the temperature sensor is designed as a semiconductor temperature sensor. It generates an electrical variable proportional to the absolute temperature. This electrical variable can preferably be represented in analog or digital form.

In a further preferred embodiment, the temperature sensor comprises a temperature probe with oscillating quartz as the measuring element. The resonant frequency of the oscillating quartz changes as a function of the temperature and can be measured very precisely. According to the invention, the temperature probes are preferably distributed on the outer surface of the punch body and particularly preferably inside the punch body.

In another preferred embodiment, the temperature sensor is implemented as a thermocouple. Thermocouples are a pair of metallic conductors made of different materials that are connected at one end. They convert a temperature difference into an electrical voltage (Seebeck effect).

Other temperature sensor alternatives according to the invention may comprise ferromagnetic temperature sensors.

In a preferred embodiment of the measuring device, the sensor is a displacement sensor or clearance sensor. Advantageously, a displacement sensor is able to precisely determine the position of a punch in the tableting machine, so that positional anomalies can be noticed immediately. Geometric changes in individual elements of the tableting machine can also be identified.

In a compression procedure of a tableting machine, the upper and lower punches preferably cover a distance that converges towards each other. By measuring this distance via displacement sensors or clearance sensors, it is preferably possible (in combination with a force sensor) to determine a ratio between compression force and displacement, so that properties of the compression material, such as elasticity, plasticity and porosity, can be advantageously derived from this.

The determination of a position, a distance or a displacement can be achieved by means of a plurality of measuring principles and thus a plurality of sensor arrangements. Accordingly, the invention is not limited to the displacement or clearance sensors listed in this document.

It is preferred that the measuring equipment comprises both direct and indirect measuring principles for determining the position, the distance or the displacement. Furthermore, the measured values can also preferably be obtained via the integration of all conceivable linear displacement measuring systems in the punch.

In a further preferred embodiment, measured values can be linked together to improve the accuracy and the statement about a condition. For example, the exact turret position in with the context of rotary tableting machines helps to improve the displacement measurement with the acceleration sensors.

A potentiometric transmitter is used in a preferred embodiment of the displacement sensor. The potentiometric transmitter is an electrical resistance component whose resistance values can be changed mechanically (by rotation or displacement). According to the invention, the potentiometric transmitter is incorporated into a punch in such a way that it changes its resistance with each rotation of the entire punch.

A similar principle is followed by strain gauges, which are used in an alternative embodiment of the displacement sensor according to the invention. A strain gauge changes its electrical resistance by changing its length and cross-section. Bridge circuits are preferably used to measure resistance. They can be used to determine an absolute resistance or to determine a relative change in resistance. When measuring with strain gauges, the relative change in resistance is measured, as already mentioned. In this context, the person skilled in the art is familiar with the design of the bridge circuit in connection with the measurement of resistance changes of strain gauges as quarter bridge, half bridge and full bridge. A strain gauge can preferably be used for detecting the displacement in the longitudinal direction of a punch.

Another preferred displacement sensor comprises a capacitive sensor. The capacitive sensor consists of two metallic parts insulated from each other. Together with the measured object, it forms a capacitor with variable capacitance. The measuring effect is based on a geometric change in the distance between the two capacitor surfaces or a lateral displacement of these, which leads to a change in the effective capacitor area.

Another embodiment of a displacement sensor may, for example, preferably be an inductive sensor. Inductive sensors basically work with an inductance (open coil), a magnetic field is generated which is changed by an object. This measuring principle makes it possible to measure angles, distances and velocities without contact or wear. Preferably, a plurality of coils are used according to the invention.

In another preferred embodiment, the measuring device comprises a force sensor. The invention is not limited to the sensors for recording forces set out below. Any force measurement that can be reasonably integrated into a punch is conceivable to enable use for compression force measurement. Preferably, force sensors are designed as pressure sensors.

In a preferred embodiment of the measuring device, the sensor comprises a pressure sensor. It has been shown that a pressure sensor within the measuring device provides good information about the wear of punches. In addition, pressure sensors can be used to determine maximum forces that must not be exceeded, for example, in order to avoid overloading.

The invention can preferably aim to determine compression forces and compression force curves. This can focus, for example, on forces within a punch, which already occur before the punch strikes against compression rollers.

Depending on the powder to be compressed and the filling, compression already takes place in the lowering rail cam of a rotary tableting machine. This is not desirable, but unavoidable. In addition, the upper punch can be pressed by the lower punch against the upper compression roller or lifting cam of a rotary tableting machine if the settings are incorrect.

Based on the measurement of a compression force curve during a complete rotation of a tableting machine which is designed as a rotary tableting machine, effects/forces can be detected that were previously not measurable in the prior art. This makes it possible, among other things, to detect wear on punches and cam courses that is otherwise not identifiable from measurements. However, such measurements can show which forces are generated when striking the compression roller and how the compression force develops with different pressing materials because it is possible to measure directly.

Continuous information about possible wear of the punches or cam courses can ensure significantly improved quality assurance. On the one hand, early replacement may be indicated. On the other hand, operating parameters can be adjusted to minimize progressive wear.

Another preferred pressure sensor is a piezoresistive pressure sensor. Piezoresistive pressure sensors use metallic strain gauges or pressure-sensitive semiconductor chips. The person skilled in the art is familiar with the following piezoresistive sensor technologies: ceramic thick-film sensors, metal thin-film sensors, silicon pressure sensors and piezoresistive silicon sensors.

Another preferred pressure sensor is a piezoelectric pressure sensor. In a piezoelectric sensor, an electrical voltage is generated in a crystal by means of pressure through charge separation (piezoelectric effect). Pressure causes ions to shift inside the crystal, creating an electric charge on the surface proportional to the force. The charge is transformed into a proportional electric voltage by a charge amplifier. Any pressure can be set as the zero point of the charge amplifier by deriving (short-circuiting) the charge, thus making pressure changes directly measurable.

In another preferred embodiment, the pressure sensor comprises a Hall element. This pressure sensor operates according to the Hall effect, whereby the magnetic field around the Hall element is changed when pressure is applied.

In an alternative preferred embodiment of the invention, the pressure sensor is a capacitive pressure sensor. Capacitive pressure sensors contain two capacitors diffused into a silicon chip. When pressure is applied, the distances between a diaphragm and two capacitor plates opposite each other are changed in opposite directions, so that the capacitances change accordingly. Preferably, the capacitors are part of an internal amplifier whose output signal depends on the difference between the capacitances.

In another preferred embodiment, the sensor comprises an inductive pressure sensor. Inductive pressure sensors work with an iron core that is connected to a membrane. Pressure changes generate a force on the membrane and move it. This causes the position of an iron core to change in opposite directions in two coils: in one, the inductance increases, in the other it decreases. The difference can advantageously be determined electrically very precisely.

In a preferred embodiment of the invention, the sensor of the measuring device is designed as an acceleration sensor. In a preferred embodiment, some of the sensors already mentioned may also assume the intended use of an acceleration sensor.

The invention is not limited to the acceleration sensors specified below and may well include other or different sensors for recording an acceleration.

With a preferred measuring device comprising an acceleration sensor, the displacement of a punch can preferably be detected. The use of an acceleration sensor is advantageously suitable for this purpose, since it does not have to have a base as a zero point or reference. Instead, the displacement is determined indirectly by integrating the measured acceleration. Nevertheless, it is possible to determine sufficiently precise information about the positional displacement of the punch, which can be used both for quality assurance of the compressed products and for process optimization.

Furthermore, the linking of these measured values with one or more further measured values, which are preferably recorded by other measuring devices and/or sensors, is preferred. This leads to improved accuracy and informative value. In the case of rotary tableting machines, for example, the exact turret position can help to improve the displacement measurement with the acceleration sensors.

Furthermore, an acceleration sensor can be used in conjunction with the force measurement to provide information about wear.

In a further preferred embodiment, a measuring device comprising an acceleration sensor is used to measure an impact of a punch. In addition, the punch can preferably be used to determine a force-displacement diagram. In particular, a displacement can be calculated from linear and rotational accelerations.

In the sense of the invention, a piezoelectric acceleration sensor is preferably used. Here, a piezoceramic sensor plate converts dynamic pressure fluctuations into electrical signals that can be processed accordingly. The pressure fluctuation is generated by a (seismic) mass attached to the piezoceramic and acts on the piezoceramic when the overall system is accelerated.

The acceleration sensor may also preferably be formed by a micro-electro-mechanical system (MEMS). This sensor is a spring-mass system in which the "spring" is preferably a silicon bar only a few micrometers (μm) wide. In addition, the mass is preferably also made of silicon. Due to the deflection during an acceleration of the punch in the tableting machine (e.g. during start-up of the turret or due to the change in direction of the up and down movement of the punch), a change in the electrical capacitance can be measured very sensitively between the spring-suspended part and a fixed reference electrode. The electronics for evaluating this small change in capacitance is preferably housed on the same integrated circuit.

In a preferred embodiment of the MEMS, a piezoresistive resistor is attached to a bending beam by ion implantation, which changes its resistance according to the bending and thus allows conclusions to be drawn about the acceleration. Ion implantation is known to the person skilled in the art and is preferably used in semiconductor technology to change the electrical properties of the base material (here: bending beam).

In another preferred embodiment, the acceleration sensor comprises a strain gauge. A force on a test mass is determined by determining the deformation of the fixture (e.g., a rod) using strain gauges. For the purposes of the invention, the punch may preferably be defined as the test mass. However, the test mass may also preferably be a mass different from the punch, which comprises the measuring device.

In a further preferred embodiment of the acceleration sensor, the acceleration is determined via magnetic induction. When the test mass suspended on a spring moves, an electric voltage is induced by a magnet in a coil. The test mass is preferably a mass different from the punch, which comprises the measuring device.

In a preferred embodiment, the acceleration sensor is a Ferraris sensor. This measures the relative acceleration without a test mass using eddy currents.

In another particularly preferred embodiment, the measurement device includes strain gauge full bridges, integrated MEMS sensors, and temperature sensors.

In the sense of the invention, the communication unit in the measuring device preferably serves for wireless transmission of recorded data of the sensor. Accordingly, the communication unit is preferably a transmitting unit. In a further embodiment, communication unit is in particular a transmitting unit and/or a receiving unit. The transmission is preferably performed by directional or non-directional electromagnetic waves, whereby the range of the frequency band used can vary from a few hertz (low frequency) to several hundred terahertz (visible light), depending on the application and the technology used. According to the invention, the following data transmission methods are preferably used: Bluetooth, WLAN, ZigBee, NFC, Wibree or WiMAX in the radio frequency range, and IrDA and optical directional radio (FSO) in the infrared and optical frequency ranges, respectively. Advantageously, it has been shown that by transmitting via such a transmitting unit, data can be transmitted wirelessly without loss of information during compression procedures in tableting machines, while a sufficient data transmission rate can be obtained. In a further embodiment, the transmitting unit and/or receiving unit comprises an antenna.

In one embodiment, wired transmission may be provided in addition or as an alternative to wireless data transmission. In one embodiment, the measuring device comprises analog and digital outputs (USB, RS232, fieldbus) for a transmission of data via signal conductor. The signal conductor preferably transmits the recorded measurement data to a programmable logic controller of the tableting machine and/or to a data processing unit on the one hand, and on the other hand, control commands are preferably transmitted to the outputs of the measuring device via the signal conductor.

In a preferred embodiment, the punch is characterized in that the measuring device comprises a sensor, a communication unit, a memory unit, an energy storage unit and a computing unit, whereby the measured values obtained as raw data can be processed by means of the computing unit. Advantageously, data (high-resolution measurements) can be saved via the memory unit so that they can be used at a later time.

In the sense of the invention, the memory unit of the measuring device serves in particular to save or store data. According to the invention, recorded measurement data of the sensor are preferably saved in the memory unit. The memory unit is preferably an electronic data carrier. A flash memory is particularly suitable for compact integration of an electronic data carrier in the measuring device, although other data carriers may also be preferred.

In a further preferred embodiment, the measuring device comprises a computing unit. According to the invention, the computing unit of the measuring device preferably comprises a processor unit. The processor unit thereby preferably comprises in particular a graphics processor (GPU) and/or a central processing unit (CPU). Both processors are known to the person skilled in the art. Many computational operations of the raw data can thus preferably already be performed decentrally on the measuring device. For example, the measurement signal can be sampled at high frequency. Mean values and min/max values can be determined from the raw data by means of the computing unit and transmitted via a communication unit to a data processing unit and/or programmable logic controller of the tableting machine. Advantageously, this saves energy and bandwidth.

In a further preferred embodiment, the measuring device is adapted to process recorded measured values as raw data by means of a computing unit and then to store them in the memory of the measuring device and/or to transmit them by means of the communication unit, preferably by means of Bluetooth, to a data processing unit and/or programmable logic controller of the tableting machine. The processing of the raw data can be represented, for example, in a conversion of the measurement data into a required format or the reduction to particularly relevant statements (see above mean values, exceedance of defined threshold values for force/acceleration/temperature/distance etc.).

Preferably, the measuring device comprises a cable output at which a preconditioned measuring signal is output as a universal analog or digital signal (e.g. 0-10 V, serial).

In a preferred embodiment of the invention, various trigger options for the memory unit and computing unit of the measuring device are available for controlling the acquisition of measurement data, e.g. in particular after certain time intervals or when threshold values (force/acceleration/temperature) are exceeded. This ensures that a data logger only stores data when certain events, such as in particular a high load, occur. In this way, accumulated collectives of stress factors can already be recorded in a stressed component. The stored measured values can be read out, for example, after completion of the measurement by means of a data processing unit (e.g. PC) and/or a programmable logic controller of the tableting machine via a simple USB connection.

In a further preferred embodiment of the invention, the measuring device, preferably its computing unit, is adapted to control and/or access to data by a data processing unit and/or a programmable logic controller of the tableting machine. For this purpose, for example, control parameters for carrying out the measurement can be sent to the measuring device. The control parameters can, for example, concern the type of measurement or a selection of active sensors (in the case of a plurality of sensors), a timing of the measurement or also instructions for the preparation or pre-evaluation of the raw data.

The data processing unit can be, for example, a tablet computer, smartphone or PC, preferably with a computer program product (application/"app") installed on it for controlling and/or accessing the data.

Preferably, the communication unit of the measuring device ensures an exchange of data between the app and the measuring device, whereby the app preferably transmits control commands to the measuring device, which can be processed by the computing unit comprised in the measuring device.

In addition to controlling the measuring device, the app is preferably adapted to to access data from the measuring device (or [processed] measured values are transmitted to the communication unit of a tablet computer or smartphone using the communication unit of the measuring device) and to visualize and/or store this data.

Further preferably, the measurement device has different transmission modes, preferably two or more, which differ in terms of bandwidth and power consumption.

A first transmission mode is preferably defined by direct communication between the measuring device and an external device (smartphone, tablet PC or programmable logic controller of the tablet machine). In the sense of the invention, this transmission mode is called streaming. In particular, the transmission mode is characterized by a high data rate.

In a second transmission mode, the measured values of the measuring device are preferably transmitted to a distribution unit. The distribution unit is connected to a variety of external devices (smartphone, tablet PC or programmable logic controller of the tablet machine), whereby these can access the data of the distribution unit. This transmission mode is preferably called broadcasting, whereby a high internal sampling rate (500 Hz) is used to acquire the measured variables and form a live mean value, as well as a min/max value, so that a high data rate is not necessary. The distribution unit can preferably also be a data processing unit.

In the following, a concrete embodiment as well as application of a preferred measuring device is described. The invention is not limited to this embodiment.

A preferred measuring device enables a time-synchronous transmission and storage of recorded measured values of two sensors with strain gauge measuring bridges. In addition, integrated MEMS sensors preferably measure a rotational speed and a 3-axis acceleration. An integrated processor unit preferably processes the sensor data already on the measuring device and thus advantageously significantly reduces the amount of data to be transmitted. The measuring device preferably enables simple and continuous monitoring of processes. The recorded measurement data and interpreted conditions are preferably transmitted to a distribution unit via Bluetooth, preferably Bluetooth Low Energy 4.2. Preferably, a large number of measuring devices can be connected to the distribution unit in a time-synchronized manner.

Under ideal conditions, the transmission range is up to 30 meters, and more than 50 devices can be connected to the distribution unit. At the same time, all measurement data is displayed and optionally stored in the application of a tablet computer or smartphone. The application is preferably used to set a calibration value of the measuring device and to configure the outputs of a gateway. The measuring device is further preferably powered by a Li-ion battery and charged by a USB power supply. The measuring device also preferably has external dimensions of 50 mm×13 mm×9 mm. Furthermore, the measuring device preferably has a flash memory with up to 8 Gb.

In a preferred embodiment, the measuring device has strain gauge sensors in addition to MEMS sensors so that, in addition to force measurement, it is also possible to record accelerations and rotational speeds as well as orientation. Modern MEMS sensors comprise an integrated temperature sensor, which means that the temperature can also be measured by the measuring device.

In a preferred embodiment of the invention, the measuring device can function in an energy self-sufficient manner. With regard to the invention, the measuring device can thus be used independently of the power supply of the tableting machine. It has been found that energy self-sufficient measuring devices can be used particularly easily in tableting machines operating according to the rotary principle. Moreover, if one sensor power source fails, only one sensor is affected, so that all sensors are independent of each other.

Preferably, the measuring device comprises a battery and/or an accumulator as energy storage, which makes the measuring device energy self-sufficient in the sense of the invention. A battery and/or accumulator preferably supplies sufficient energy for the communication unit to transmit the data.

In a further embodiment, the battery or accumulator preferably supplies energy for the functioning of the measuring device. In particular, the computing unit, the communication unit and the sensor are simultaneously supplied with sufficient energy. Preferably, the measuring device comprises an output for a charging connection, for charging the accumulator.

In another preferred embodiment, an integrated overcharge and discharge protection of the accumulator is included in the measuring device for safe operation of the measuring device.

In another preferred embodiment, the accumulator is designed as a Li-Ion or Li-Po accumulator. Furthermore, the measuring device can comprise an LED display.

In a further preferred embodiment, the measuring device is energy self-sufficient with respect to the power supply of the tableting machine by providing induction current/induction. In a preferred embodiment, there is an electrical conductor in the punch that moves in a magnetic field. The magnetic field can preferably be generated by a coil mounted inside and/or outside the turret. The movement of the conductor induces a current which is used for the operation of the measuring device In a preferred embodiment, the measuring device comprises a photovoltaic cell (solar cell), which also reacts well to artificial light in machine halls. By means of the photoelectric effect, light energy is converted into electrical energy and the measuring device can be operated in an energy self-sufficient manner according to the invention. The generated electricity is preferably used directly for the measuring operation.

In another preferred embodiment, the generated electricity is stored in above-mentioned accumulators.

In a further preferred embodiment, the measuring device of a punch is connected to at least one second measuring device of a second punch. In a preferred embodiment, the connection is formed by a signal conductor. In a further preferred embodiment of the invention, the connection is wireless via the communication unit. Preferably, power and/or data can be transmitted via the connection of the measuring devices. Further preferably, all measuring devices can be connected to a distribution unit.

In a preferred embodiment of the invention, the punch is characterized in that the measuring device is integrated within the punch body. According to the invention, the punch body is preferably defined by the punch barrel, punch tip and punch head, whereby the punch body is preferably designed as a thick-walled hollow body or as a solid body. The advantage of an integrated measuring device is that the outer geometry of the punch is not changed, so that the geometric parameters of a tableting machine do not have to be changed due to the punch.

In a further preferred embodiment, the measuring device is precisely fitted into a punch designed as a solid body. The punch is machined with separating manufacturing processes in such a way that the measuring device can be inserted into the punch in a subsequent assembly process. Preferably, connecting means can also be used here. The measuring device can therefore preferably be inserted in the punch in a material-locking, force-locking and/or form-locking manner.

In a preferred alternative according to the invention, the measuring device is attached to the inner wall of the thick-walled hollow body of a punch. Preferably, access to the measuring device can be provided via a transverse hole to the longitudinal axis of the punch in order to be able to connect signal lines or feed out antennas.

In an exemplary embodiment, the measuring device is inserted into a punch with a shell diameter of 25.4 mm or into a punch with a shell diameter of 19 mm.

In preferred embodiments, the computing unit of the measuring device is connected to one or more data processing units and/or a programmable logic controller of a tableting machine.

In a preferred embodiment, a data processing unit is provided as a component external to the tableting machine, which is designed as a stand-alone device—independent of the tableting machine.

In a further preferred embodiment, a data processing unit is present as an internal data processing unit. An internal data processing unit can preferably be a component of the tableting machine and, for example, be integrated in the frame of a tableting machine. It is preferably also designed as a programmable logic controller of the tableting machine and is preferably also referred to as a machine controller.

In preferred embodiments, the measuring device may communicate with one or more of the data processing units (e.g., external: PC, smartphone, tablet, or internal: machine control system).

Direct communication between the measuring device and the machine control system allows the operating parameters of the tableting machine to be quickly adjusted on the basis of the measurement results. For example, to avoid wear when predefined force limits are exceeded, the machine control system could adjust the operating parameters based on the transmitted information.

However, communication of the measuring device with an (external) data processing unit, for example a PC, a tablet computer, smartphone, is particularly preferred. A data processing unit can thus also be designed as an external component (e.g. tablet computer, smartphone). Preferably, the external component communicates with both the measuring device and the machine control system.

For example, the (pre-processed) measurement results of the measuring unit can first be transmitted to a data processing unit in the form of a PC, tablet computer, etc., or a computer program installed thereon. By means of the external components, a more extensive evaluation of the measurement results can be carried out, for example, for monitoring and/or logging the tableting process.

On the basis of the evaluation and verification by the personnel, the operating parameters can, for example, subsequently be adjusted by sending corresponding control commands to the machine control system.

However, the possibility of acquiring and recording the data of the measuring device on the data processing system already offers a number of advantages independent of a possible adjustment of the operating parameters. In particular, recording measurement data can ensure logging and thus quality assurance of the production process. If predefined tolerance limits for the compression forces are exceeded, for example, the corresponding compressed products can be marked for further inspection. The recording of the measurement data also permits early detection of wear, as explained above. Based on the information, repair or replacement of the respective components can be indicated or the maintenance interval can be adjusted.

The invention further relates to a tableting machine comprising a punch of the type mentioned above.

In a further preferred embodiment, the invention relates to a tableting machine comprising a programmable logic controller, the latter comprising at least a computing unit, a communication unit and a memory unit, and the measuring device of the punch comprising a communication unit, characterized in that the communication unit of the programmable logic controller is compatible with the communication unit of the measuring device of the punch. According to the invention, the communication unit of the programmable logic controller can be designed as a transmitting and/or receiving unit. The advantage of integrating the punch according to the invention into the tableting machine is, in particular, the possibility of monitoring the tableting machine during operation and/or when idle.

In the sense of the invention, compatibility of the communication units means that they are able to communicate with each other. In the sense of the invention, both communication units use the same data transmission methods already mentioned above, so that data can be sent or transmitted mutually.

In a further preferred embodiment, the tableting machine is designed as a rotary tableting machine or eccentric tableting machine. A rotary tableting machine preferably comprises a punch of the type mentioned above, a turret, a die table, a punch guide for receiving punches, a power supply and an upper and lower compression roller.

An eccentric tableting machine preferably comprises a punch of the type mentioned above, a die and a power supply.

In further preferred embodiments, a data processing unit, such as a smartphone or tablet computer, comprises a computing unit, a communication unit, and a memory unit. According to the invention, the communication unit of the data processing unit also serves to receive data from (and/or to send data to) the communication unit of the measuring device and/or the programmable logic controller of the tableting machine. The communication unit can receive/send the data by cable, but especially a wireless transmission of the data takes place.

In a preferred embodiment, the communication unit of the data processing unit and/or programmable logic controller of the tablet machine preferably sends data for controlling the measuring device to the communication unit of the measuring device.

For example, the communication unit of the data processing unit and/or the programmable logic controller of the tableting machine can send control parameters to the measuring device for carrying out a measurement. The control parameters may, for example, concern a type of measurement or a selection of active sensors (in the case of multiple sensors). Also a timing of the measurement, a preferred transmission mode or even instructions for the preparation or pre-evaluation of the raw data can be defined.

In a preferred embodiment, the communication unit of the measuring device sends data, preferably processed (prepared) measurement data, to the communication unit of the (external) data processing unit and/or the programmable logic controller of the tableting machine.

The data transmitted by the measuring device is preferably stored on the memory unit of the data processing unit and/or programmable logic controller of the tableting machine. In the sense of the invention, the memory unit of the data processing unit and/or programmable logic controller of the tableting machine preferably serves to save or store data. According to the invention, preferably recorded measurement data of the sensor are saved in the memory unit. This concerns both the data obtained directly via the measuring device and the analysis results of the data processing unit and/or programmable logic controller of the tableting machine itself. Preferably, software programs as well as, among other things, command sequences, mathematical and statistical models are also stored on the memory unit, which can be provided as described for controlling the measuring device and/or for accessing (reading out) the data of the measuring device. The memory unit is preferably an electronic data carrier.

The computing unit of the data processing unit and/or programmable logic controller of the tableting machine preferably comprises a processor unit. The processor unit thereby preferably comprises a graphics processor (GPU) and/or a central processing unit (CPU).

In a further preferred embodiment of the invention, at least one measuring device is attached to at least one arbitrary element of the tableting machine. Preferably, an arbitrary element means a punch, turret, die plate, punch guide for receiving punches, power supply, and an upper and lower compression roller of a rotary tableting machine.

In another preferred embodiment, the invention relates to a system comprising a data processing unit and a tableting machine of the type described above, wherein the measuring device of the punch comprises a communication unit and the tableting machine comprises a programmable logic controller, characterized in that the data processing unit and/or the programmable logic controller of the tableting machine is adapted to,
- receive and further process measured values from the measuring device, preferably processed (prepared) raw data, and/or
- transmit control commands to the measuring device.

Such a system is advantageously suited for monitoring tableting processes, since the measurement data can be processed (visualized and/or analyzed) on a device external to the measuring device with increased storage and computing capacity, whereas the measuring device can be kept very compact and need only comprise a few components. This entails a situation where the evaluation of the data can preferably take place online (directly) without the measuring device having to be removed or read out manually. In addition, the measuring device advantageously records measured values directly at the punch so that particularly precise and detailed statements can be made about the compression procedure. Furthermore, the measuring device can receive control commands from users (or automatically) via external devices (data processing units or a programmable logic controller of the tableting machine) so that certain parameters (e.g. sampling rates) can be set from a remote position.

In a further preferred embodiment, the invention relates to a method for monitoring a tableting machine using a punch of the type mentioned above, wherein the measuring device of the punch comprises a sensor, a computing unit, a communication unit and a memory unit, and the tableting machine comprises a programmable logic controller with a communication unit, characterized in that
- the sensor of the measuring device records physical and/or chemical properties;
- the measured values recorded as raw data are processed (prepared) by the computing unit of the measuring device;
- the processed (prepared) measured values are sent to the programmable logic controller of the tableting machine and/or data processing unit via the communication unit of the measuring device and/or the processed (prepared) measured values are saved on the memory unit of the measuring device.

The advantage of a method according to the invention is the possibility of monitoring and analyzing the condition of the tableting machine during operation and/or when idle.

In a further preferred embodiment, the monitoring of the tableting machine is preferably a technical monitoring. On the one hand, such monitoring is designed to prevent malfunctions and to enable timely measures or repairs. On the other hand, it is an effective possibility for technical further development and for prevention of environmental damage.

In a preferred embodiment, the method is characterized in that the sensor of the measuring device records, in particular, a force, temperature or acceleration of the punch and/or its environment and/or the speed of the turret.

In a further preferred embodiment, the recorded measured values are saved in the memory unit of the data processing unit and/or in the memory unit of the programmable logic controller and/or in the memory unit of the measuring device.

In another preferred embodiment, the method is characterized in that the programmable logic controller of the tableting machine and/or the data processing unit, preferably a tablet computer and/or a smartphone, can transmit control commands to the measuring device, preferably by means of a computer program product (application/app) installed on these devices.

In another preferred embodiment of the invention, the saved measurement data is preferably analyzed by algorithms.

In a preferred embodiment of the invention, the memory unit of the measuring device is detachably affixed so that a user of the machine can manually connect the data to be evaluated to a the programmable logic controller of the tablet machine and/or the data processing unit.

In another preferred embodiment of the invention, the computing unit of the data processing unit and/or the programmable logic controller directly accesses the measurement data stored in the memory unit of the data processing unit and/or in the memory unit of the programmable logic controller and executes the algorithms for analyzing the measurement data that are also stored in the memory unit.

By analyzing the measurement data with the help of algorithms, faults, wear and failures of a punch and/or other components of a tableting machine can be detected at an extremely early stage.

In a further preferred embodiment of the invention, the method is characterized in that the recorded measured values of the measuring device are analyzed via machine learning algorithms.

In a further preferred embodiment, external parameters and/or measured values from a punch are incorporated into the analysis of the method for monitoring a tableting machine. These can be determined by measuring devices that are independent of the measuring device according to the invention. For example, in the case of rotary tableting machines, recorded measurement data of the compression roller (e.g., compression forces), the turret (e.g., rotations), the die table or, in a simple case, the ambient temperature of the tableting machine can also be saved in a memory unit of the data processing unit of the tableting machine and subsequently analyzed by the following algorithms. A large number of different recorded data allows a comprehensive analysis with few errors.

In a further preferred embodiment, the method is characterized in that the recorded measured values of the measuring device are analyzed in combination with externally recorded and/or provided measured values via algorithms (preferably machine learning algorithms).

In the sense of the invention, machine learning algorithms are a subarea of artificial intelligence. Machine Learning uses mathematical and statistical models to "learn" from data sets. In general, machine learning algorithms have the advantage that information that is too complex for a human observer can be automatically extracted from a large data set. There are a variety of machine learning algorithms that can be broadly categorized into three different learning methods: supervised learning, unsupervised learning, and reinforcement learning.

In a preferred embodiment, supervised learning is used to analyze or process the stored measurement data. In the supervised learning method, a so-called training process is first carried out. Here, training data is provided in the form of input data together with the corresponding target data. The purpose of training is generally in machine learning methods to adjust parameters of a function so that the function is subsequently able to determine the target value with high accuracy from the corresponding input value. The adapted function is then used after the training process to predict target data for previously unseen input data. The function is described by a mathematical and/or statistical model.

In a preferred embodiment, the function is designed by support vector machines, Bayesian networks and/or decision trees. Particularly preferably, the function is described by an artificial neural network. In accordance with the invention, the artificial neural networks can have different architectures.

In the sense of the invention, the input data are preferably defined by machine parameters, environmental parameters and/or measured data of the measuring device. Machine parameters are preferably rotational speed of the turret, various material properties and/or key figures of the components, running time or operating time, age of the machine, number of punches or other components, etc. Environmental parameters are preferably ambient temperature, humidity, etc.

Preferably, the measured data from different measuring devices, equipped with different sensors for measuring different physical and/or chemical properties, are used as input data.

According to the invention, target data are preferably adapted to show a probability for the occurrence of damage, the failure of a component or for a faulty execution of a pressing process.

In another preferred embodiment, the Unsupervised Learning method is used to analyze or process the stored measurement data. In Unsupervised Learning, the algorithm attempts to detect patterns in the input data that deviate from unstructured background noise. The function in the training process is oriented only on the similarities of the input data and adjusts its parameters accordingly, such that no output data is used for the training process.

In a preferred embodiment, the Unsupervised Learning method is used to segment or cluster the input data or, preferably, to compress the input data.

In a preferred embodiment, the Unsupervised Learning Algorithm preferably comprises Principal Component Analysis (PCA) and/or the K-Means algorithm and/or at least one neural network.

As already described, in both methods mentioned above, so-called training processes are carried out in a first step to determine optimal parameters of an above-mentioned machine learning function. Based on the adapted function, various statements are made after the training for previously unknown input data.

In another preferred embodiment, the reinforcement learning method is used for the analysis or processing of the stored measurement data. In the reinforcement learning method, on the other hand, the training process takes place continuously even after the parameters of a function have been adjusted. Via "trial and error", effects of different statements are observed and evaluated using the adapted function for previously unknown input data. In response to these statements, the algorithm receives feedback, represented abstractly in the form of a reward or punishment. Whereupon the algorithm further optimizes the function based on its parameters. Accordingly, the algorithm continuously adjusts or modifies the function of the machine learning process. Preferably, reinforcement learning can use the Q-learning method and/or the above-mentioned neural networks and/or further neural networks as well as further algorithms known to the person skilled in the art.

What is claimed is:

1. A punch for a tableting machine comprising:
a measuring device that is energy self-sufficient and can function independently of a power supply to the tableting machine, wherein the measuring device is incorporated inside a punch body and comprises a first sensor for recording a force and a second sensor for recording an acceleration of the punch,
wherein the measuring device comprises a communication unit, a memory unit, an energy storage unit and a computing unit,
wherein the computing unit comprises a processor unit adapted to process measured values obtained as raw data to obtain processed measured values,
wherein the communication unit is configured for a wireless transmission of the processed measured values, to a control unit of the tableting machine,
wherein the control unit is configured to receive the processed measured values, during and/or after compression procedures,
wherein the control unit is further configured to perform an analysis of the processed measured values and to adjust operating parameters of the tableting machine, when the analysis of the processed measured values indicates a defective compression procedure,
and wherein the analysis of the processed measured values takes place online (directly) during operation of the tableting machine without the punch having to be removed from the tableting machine.

2. The punch of claim 1, wherein the tableting machine is a rotary tableting machine or eccentric tableting machine.

3. A tableting machine comprising the punch according to claim 1.

4. A system comprising:
the tableting machine comprising a punch according to claim 3;
a data processing unit;
wherein the tableting machine comprises a programmable logic controller, and
wherein the data processing unit or the programmable logic controller are adapted to: (i) receive and further process measured values from the measuring device or (ii) transmit control commands to the measuring device.

5. A method of monitoring a tableting machine using a punch according to claim 1, wherein:
the tableting machine comprises a programmable logic controller with a communication unit, wherein:
the measured values recorded as raw data are processed by the computing unit of the measuring device; and
the processed measured values are sent to the programmable logic controller of the tableting machine or data processing unit via the communication unit of the measuring device or the processed measured values are saved on the memory unit of the measuring device.

6. The method of claim 5, wherein the sensor of the measuring device records a force, temperature or acceleration of the punch or its environment.

7. The method of claim 5, wherein the programmable logic controller of the tableting machine or the data processing unit can transmit control commands to the measuring device.

8. The method of claim 5, wherein the recorded measured values of the measuring device are analyzed.

9. A method for using the punch of claim 1 comprising detecting a displacement of the punch by integrating the measured acceleration of the punch.

10. A method for using the punch of claim 1 comprising obtaining information related to a quality of the compression procedures by measuring displacement and force acting on the punch.

11. A method for using the punch of claim 1 in connection with a tableting machine comprising receiving and evaluating measured data from the punch and tableting machine while the tableting machine is online and without removing the punch from the tableting machine.

12. The punch of claim 1 wherein the measuring device is incorporated inside the punch by fitting it inside the punch body.

13. The punch of claim 1 wherein the punch comprises a hollow punch body and the measuring device is attached to an inner wall surface of the hollow punch body.

14. A tableting machine comprising:
a punch comprising a measuring device that is energy self-sufficient and can function independently of a power supply to the tableting machine, wherein the measuring device is incorporated inside a punch body and comprises a first sensor for recording a force and a second sensor for recording an acceleration of the punch,
wherein the measuring device comprises a communication unit, a memory unit, an energy storage unit and a computing unit,
wherein the computing unit comprises a processor unit adapted to process measured values obtained as raw data, and
wherein the communication unit is configured for a wireless transmission of the processed measured values to a control unit of the tableting machine, and
wherein the control unit is configured to receive the processed measured values during and/or after compression procedures,
wherein the control unit is further configured to perform an analysis of the processed measured values and to adjust operating parameters of the tableting machine, when the analysis of the processed measured values indicates a defective compression procedure,
and wherein the analysis of the processed measured takes place online (directly) during operation of the tableting machine without the punch having to be removed from the tableting machine.

15. The method of claim 11 wherein the control unit of the tableting machine performs an analysis of the processed measured values and adjusts operating parameters of the tableting machine, when the analysis of the processed measured values indicates a defective compression procedure, and wherein said analysis of the processed measured takes place online (directly) during operation of the tableting machine without the punch having to be removed from the tableting machine.

16. The punch of claim 1, wherein the computing unit is configured to perform computational operations on the raw data in order to determine a mean value, min/max value and/or the exceedance of defined threshold values for the measured force and/or displacement.

17. The punch of claim 1, wherein the computing unit is configured to perform computational operations on the raw data to reduce the bandwidth necessary for transmitting the processed raw data and to facilitate the evaluation of the measurement values online (directly) during operation of the tableting machine.

18. The punch of claim 1, wherein control unit comprises software programs for the analysis of the processed measured values and the adjustment of operating parameters of the tableting machine, when the analysis of the processed measured values indicates a defective compression procedure.

* * * * *